United States Patent
Ishikawa et al.

(10) Patent No.: US 10,629,387 B2
(45) Date of Patent: Apr. 21, 2020

(54) POROUS CARBON MATERIAL FOR ELECTRIC DOUBLE-LAYER CAPACITOR ELECTRODE, METHOD OF PRODUCING THE SAME, AND ELECTRIC DOUBLE-LAYER CAPACITOR ELECTRODE

(71) Applicant: Sumitomo Electric Industries, Ltd., Osaka-shi (JP)

(72) Inventors: Shinji Ishikawa, Yokohama (JP); Takahiro Saito, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/060,602

(22) PCT Filed: Jun. 2, 2017

(86) PCT No.: PCT/JP2017/020709
§ 371 (c)(1),
(2) Date: Jun. 8, 2018

(87) PCT Pub. No.: WO2017/213057
PCT Pub. Date: Dec. 14, 2017

(65) Prior Publication Data
US 2018/0374657 A1    Dec. 27, 2018

(30) Foreign Application Priority Data
Jun. 6, 2016 (JP) .................. 2016-112788

(51) Int. Cl.
*H01G 11/24* (2013.01)
*H01G 11/34* (2013.01)
*H01G 11/44* (2013.01)
*C01B 32/30* (2017.01)
*H01G 11/86* (2013.01)
(Continued)

(52) U.S. Cl.
CPC ............. *H01G 11/24* (2013.01); *C01B 32/30* (2017.08); *C01B 32/324* (2017.08);
(Continued)

(58) Field of Classification Search
CPC ........ H01G 11/24; H01G 11/86; H01G 11/44; H01G 11/39; H01B 1/02; H01B 1/04
(Continued)

(56) References Cited

U.S. PATENT DOCUMENTS

2013/0183511 A1* 7/2013 Dai ................. B82Y 30/00
                                                       428/220
2015/0104370 A1    4/2015 Ishikawa et al.
(Continued)

FOREIGN PATENT DOCUMENTS

CN    104411635 A    3/2015
JP    62-167212 A    7/1987
(Continued)

*Primary Examiner* — Tri V Nguyen
(74) *Attorney, Agent, or Firm* — Baker Botts L.L.P.; Michael A. Sartori (57) ABSTRACT

A porous carbon material for an electric double-layer capacitor electrode, in which the porous carbon material is formed from secondary particles having a particle size of from 3 μm to 100 μm, the secondary particles are formed from primary particles having a particle size of from 0.1 μm to 0.5 μm, and the porous carbon material has an internal specific surface area of 900 m²/g or greater.

7 Claims, 3 Drawing Sheets

(51) Int. Cl.
*C01B 32/324* (2017.01)
*C01B 32/336* (2017.01)
*C01B 33/02* (2006.01)

(52) U.S. Cl.
CPC ............ *C01B 32/336* (2017.08); *C01B 33/02* (2013.01); *H01G 11/34* (2013.01); *H01G 11/44* (2013.01); *H01G 11/86* (2013.01); *Y02E 60/13* (2013.01)

(58) Field of Classification Search
USPC ................................ 252/500, 502, 506, 510
See application file for complete search history.

(56) References Cited

U.S. PATENT DOCUMENTS

| | | | |
|---|---|---|---|
| 2015/0221952 A1* | 8/2015 | Ma | H01M 10/052 429/405 |
| 2017/0263386 A1 | 9/2017 | Ishikawa et al. | |

FOREIGN PATENT DOCUMENTS

| | | | | |
|---|---|---|---|---|
| JP | H08-097101 A | 4/1996 | | |
| JP | 2001-089119 A | 4/2001 | | |
| JP | 2004-513529 A | 4/2004 | | |
| JP | 2006-513969 A | 4/2006 | | |
| WO | 02/039468 A2 | 5/2002 | | |
| WO | 2004/094307 A1 | 11/2004 | | |
| WO | 2013-190945 A1 | 12/2013 | | |
| WO | 2016031977 A1 | 3/2016 | | |
| WO | WO-2016147488 A1 * | 9/2016 | ............. | B01D 39/20 |

\* cited by examiner

POROUS CARBON MATERIAL FOR ELECTRIC DOUBLE-LAYER CAPACITOR ELECTRODE, METHOD OF PRODUCING THE SAME, AND ELECTRIC DOUBLE-LAYER CAPACITOR ELECTRODE

TECHNICAL FIELD

The present invention relates to a porous carbon material for an electric double-layer capacitor electrode, a method of producing the porous carbon material, and an electric double-layer capacitor electrode.

This application is based upon and claims the benefit of priority from Japanese Patent Application No. 2016-112788. filed Jun. 6, 2016. the entire contents of which are incorporated herein by reference.

BACKGROUND ART

An electrode material is disclosed in Patent Literature 1 which is an activated carbon with an average particle size of 20 to 30 μm and consists of an activated carbon (A) having voids of 1 nm to 30 nm in a particle and a porous carbon (B) with an average particle size of 0.1 to 20 μm, where the porous carbon (B) is inserted into a gap between particles created by the activated carbons (A). In addition, a carbonaceous material is disclosed in Patent Literature 2 in which a micropore volume is 10 to 60% of the total pore volume, a mesopore volume is 20 to 70% of the total pore volume, and a macropore volume is 20% or less of the total pore volume, wherein the total pore volume is 0.3 cm$^3$/g to 2.0 cm$^3$/g and the total specific surface area is 1000 to 2500 m$^2$/g.

CITATION LIST

Patent Literature

Patent Literature 1: JP-A-8-97101
Patent Literature 2: JP-A-2001-89119

SUMMARY OF THE INVENTION

A porous carbon material for an electric double-layer capacitor electrode according to one aspect of the present disclosure, wherein
the porous carbon material is formed from secondary particles having a particle size of from 3 μm to 100 μm,
the secondary particles are formed from primary particles having a particle size of from 0.1 μm to 0.5 μm, and
the porous carbon material has an internal specific surface area of 900 m$^2$/g or greater.

A method of producing a porous carbon material for an electric double-layer capacitor electrode according to the other aspect of the present disclosure, the method including steps of:
obtaining a porous carbon material precursor, in which secondary particles having a particle size of from 3 μm to 100 μm are formed, by aggregation of primary particles having a particle size of from 0.1 μm to 0.5 μm from a raw material of porous carbon material; and
obtaining a porous carbon material by heat treatment of the porous carbon material precursor.

In order to achieve the above object, an electric double-layer capacitor electrode according to one aspect of the present disclosure includes a porous carbon material according to the other aspect of the present disclosure.

DESCRIPTION OF EMBODIMENTS

[Problems to be Solved by Disclosure]

When pore size of a porous carbon material used for an electrode material of an electric double-layer capacitor (hereinafter, simply referred to as a capacitor) is too small, since the mobility of ions existing in an electrolyte in the capacitor is inhibited, the internal resistance of the capacitor increases and output characteristics deteriorates. On the other hand, when the ratio of mesopores in the porous carbon material is large, the internal resistance of the capacitor can be improved, but since there are many pores which do not contribute to the increase in capacitance, the capacitance per pore volume is decreased.

The present disclosure is to provide a porous carbon material for an electric double-layer capacitor electrode, a method of producing the porous carbon material, and an electric double-layer capacitor electrode which can reduce resistance while keeping capacitance large.

[Effects of Disclosure]

According to the present disclosure, it is possible to provide a porous carbon material for an electric double-layer capacitor electrode, a method of producing the porous carbon material, and an electric double-layer capacitor electrode which can reduce resistance while keeping capacitance large.

[Description of Embodiments]

First, the contents of an embodiment of the present invention will be listed and described.

(1) A porous carbon material for an electric double-layer capacitor electrode according to the present invention, wherein
the porous carbon material is formed from secondary particles having a particle size of from 3 μm to 100 μm,
The secondary particles are formed from primary particles having a particle size of from 0.1 μm to 0.5 μm, and
the porous carbon material has an internal specific surface area of 900 m$^2$/g or greater.

According to such a configuration, capacitance of a capacitor can be increased by the increase of the specific surface area due to the primary particles of submicron order size, and contact resistance between particles can be reduced by the formation of the secondary particles from the primary particles.

(2) In the porous carbon material according to (1) described above, the primary particles may be bonded to each other by neck growth.

According to such a configuration, since the primary particles are bonded to each other, it is possible to further reduce the contact resistance between the primary particles.

(3) In the porous carbon material according to (1) or (2) described above, the porous carbon material may have an external specific surface area of from 5 $m^2/g$ to 50 $m^2/g$.

According to such a configuration, in the capacitor, the external specific surface area of the porous carbon material is within the above range, and the contact area between the ions in the electrolyte and the porous carbon material becomes larger, whereby it is possible to reduce electric resistance which is a factor of the mobility barrier of the ions in the electrolyte.

(4) In the porous carbon material according to any one of (1) to (3) described above, a peak of a pore size of micropores in the porous carbon material may be in a range of from 7.0 Å to 10 Å which is calculated by a QSDFT method from a nitrogen adsorption isotherm.

According to such a configuration, since the pore size of the micropores is larger than the maximum size of organic ions in the electrolyte, it is possible to reduce the electric resistance which is a factor of the mobility barrier of the ions in the electrolyte. In addition, since the pore size of the micropores is smaller than the pore size of 15 Å or greater, which does not contribute to the capacitance of the electrode, the capacitance of the electrode can be improved.

(5) In the porous carbon material according to any one of (1) to (3) described above, a pore volume of micropores in the porous carbon material may be 0.3 $cm^3/g$ or greater which is calculated by a t method from a nitrogen adsorption isotherm, and a pore size of the micropores is 0.63 nm or greater which is calculated by the t method from the nitrogen adsorption isotherm.

According to such a configuration, since the pore size of the micropores is larger than the maximum size of the organic ions in the electrolyte, it is possible to reduce the electric resistance being a factor of the mobility barrier of the ions in the electrolyte.

(6) In the porous carbon material according to any one of (1) to (3) described above, a pore volume of mesopores in the porous carbon material may be 0.1 $cm^3/g$ or greater which is calculated by a BJH method from a nitrogen adsorption isotherm.

According to such a configuration, since an appropriate amount of mesopores exists, it is possible to reduce the electric resistance being a factor of the mobility barrier of the ions in the electrolyte.

(7) A method of producing a porous carbon material for an electric double-layer capacitor electrode according to an embodiment of the present invention, the method including steps of:

obtaining a porous carbon material precursor, in which secondary particles having a particle size of from 3 μm to 100 μm are formed, by aggregation of primary particles having a particle size of from 0.1 μm to 0.5 μm from a raw material of porous carbon material; and obtaining a porous carbon material by heat treatment of the porous carbon material precursor.

According to such a configuration, the specific surface area is increased due to the primary particles of submicron order size, and the primary particles are bonded to each other to form the secondary particles, whereby it is possible to obtain the porous carbon material capable of reducing the contact resistance between the primary particles.

(8) In the method of producing the porous carbon material according to (7) described above, the porous carbon material precursor may have an external specific surface area of from 5 $m^2/g$ to 50 $m^2/g$.

According to such a configuration, in the electric double-layer capacitor, the contact area between the ions in the electrolyte and the porous carbon material becomes larger, whereby it is possible to obtain the porous carbon material capable of reducing electric resistance which is a factor of the mobility barrier of the ions in the electrolyte.

(9) In the method of producing the porous carbon material according to (7) or (8) described above, the raw material of porous carbon material may be a mixture of $SiO_2$ and a carbon-containing material, and the mixture may be heated at 1450° C. or higher under an inert gas atmosphere, thereby obtaining the porous carbon material precursor.

According to such a configuration, it is possible to obtain the SiC precursor having the β-type crystal structure and the primary particle size of from 0.1 μm to 0.5 μm, and to efficiently obtain the porous carbon material according to (1) described above.

(10) In the method of producing the porous carbon material according to (9) described above, a molar ratio of $SiO_2$ and C in the mixture may satisfy a relation of $SiO_2$:C=1:3 to 1:4.

According to such a configuration, it is possible to reduce $SiO_2$ remaining in the obtained precursor. Further, a carbon component may remain, the residual carbon can be burned and removed in air or oxygen containing atmosphere.

(11) In the method of producing the porous carbon material according to (7) or (8) described above, the raw material of porous carbon material may be a raw material of chaff which is obtained by carbonizing and crushing chaff, a molar ratio of $SiO_2$ and C in the raw material of chaff may satisfy a relation of $SiO_2$:C=1:3 to 1:4. and the raw material of chaff may be heated at 1450° C. or higher under an inert gas atmosphere, thereby obtaining the porous carbon material precursor.

According to such a configuration, it is possible to obtain the SiC precursor, in which the remaining SiO2 is reduced, the crystal structure is a β-type, and particle size is 0.1 μm or greater and 0.5 μm or smaller, with a simple method and to efficiently obtain the porous carbon material according to (1) described above. When a heating temperature under the inert gas atmosphere is 1650° C. or higher, since the crystal type of the produced SiC changes to an α-type and treatment energy increases, it is not preferable to set the heating temperature to an excessively high temperature.

(12) In the method of producing the porous carbon material according to (11) described above, the raw material of chaff may be subjected to acid treatment before the porous carbon material precursor is obtained.

According to such a configuration, it is possible to elute and remove impurities other than $SiO_2$ and carbon contained in the raw material of chaff, and to reduce the amount of impurities in the porous carbon material precursor.

(13) In the method of producing the porous carbon material according to any one of (7) to (12) described above, the porous carbon material precursor may be subjected to the heat treatment under a chlorine atmosphere, thereby obtaining the porous carbon material.

According to such a configuration, a silicon component is selectively removed from the porous carbon material precursor having the β-type SiC structure, and the carbon material having the structure in which the silicon component is removed from the crystal structure is formed.

(14) In the method of producing the porous carbon material according to (13) described above, the heat treatment under the chlorine atmosphere may be performed at a temperature of from 700° C. to 1100° C.

According to such a configuration, the reaction rate becomes a reliable condition, and the porous carbon material can be advantageously obtained from the viewpoint of heating energy cost. At a temperature lower than 700° C., the reaction rate is low, which is not preferable to efficiently produce the porous carbon material. At a temperature higher than 1100° C., there is a possibility that the formed porous nanostructure may not have a desired size due to heat deformation, which is not preferable.

(15) In the method of producing the porous carbon material according to (13) or (14) described above, the method may include a step of:

subjecting the porous carbon material to activation treatment by heat treatment of the porous carbon material under a water vapor atmosphere or a $CO_2$ atmosphere.

According to such a configuration, it is possible to increase the specific surface area while maintaining the structure of the porous carbon material according to (1) described above, whereby a capacitor having high capacitance can be obtained.

(16) In the method of producing the porous carbon material according to (7) or (8) described above, the porous carbon material precursor may be a hydrocarbon-based precursor obtained by heating and sintering a hydrocarbon-based raw material, and the heat treatment may be activation treatment under a water vapor atmosphere or a $CO_2$ atmosphere.

(17) In the method of producing the porous carbon material according to (15) or (16) described above, the activation treatment may be performed at a temperature of from 700° C. to 1000° C.

According to such a configuration, the reaction rate becomes a reliable condition, and the porous carbon material can be advantageously obtained from the viewpoint of heating energy cost. At a temperature higher than 100° C., the reaction rate becomes too fast to make it possible to efficiently obtain micropores, which is not preferable.

(18) In the method of producing the porous carbon material according to (7) or (8) described above, the raw material of porous carbon material may be a mixture of Si and a carbon-containing material, a molar ratio of Si and C in the mixture may satisfy a relation of Si:C=1:1.1 to 1:1.5. and the raw material of porous carbon material may be heated at 1250° C. or higher under an inert gas atmosphere, thereby obtaining the porous carbon material precursor.

According to such a configuration, it is possible to reduce Si remaining in the obtained precursor. Further, there is a possibility that the carbon component may remain, but the residual carbon can be removed by burning in an air atmosphere or in an oxygen-containing atmosphere.

(19) An electric double-layer capacitor electrode according to an embodiment of the present invention includes the porous carbon material according to any one of (1) to (6) described above.

According to such a configuration, it is possible to reduce resistance of the capacitor while keeping capacitance thereof large.

[Detailed Description of Embodiment of Present Invention]

An embodiment of the present invention will be described in detail below.

1. Porous Carbon Material

Figure 1:
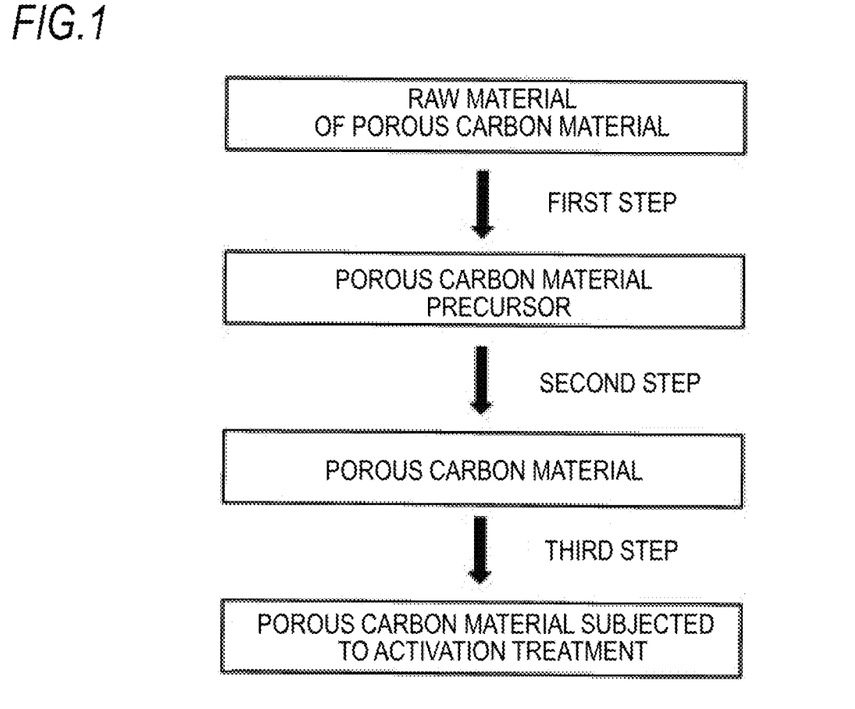
FIG. 1 is a flowchart illustrating a production process of a porous carbon material according to an embodiment of the present invention.

As in a flowchart illustrated in FIG. 1, a porous carbon material for an electric double-layer capacitor electrode according to the embodiment can be produced by a first step of obtaining a porous carbon material precursor, in which secondary particles having a particle size of from 3 μm to 100 μm are formed, by aggregation of primary particles having a particle size of from 0.1 μm to 0.5 μm, from a raw material of porous carbon material and a second step of obtaining a porous carbon material by heat treatment of the porous carbon material precursor.

1-1. Producing Method via β-type SiC

The porous carbon material for the electric double-layer capacitor electrode according to the embodiment can be produced a producing method via β-type SiC.

In this case, an example of the raw material of porous carbon material used in the first step may include a mixture of $SiO_2$ and a carbon-containing material, a mixture of Si and a carbon-containing material, or a raw material of chaff obtained by carbonizing and crushing of chaff When the mixture of $SiO_2$ and carbon-containing material is used as the raw material of porous carbon material, a high carbon-containing material such as carbon black or coke can be used as the carbon-containing material. In the first step, SiC (porous carbon material precursor) having a β-type crystal structure can be obtained by heating of the mixture at a temperature of 1450° C. or higher under an inert gas atmosphere. As the inert gas, a rare gas such as He, Ar, or Ne is preferably used. When $N_2$ is used, since Si and N bind to each other form a silicon nitride-based compound, thereby inhibiting reaction with a chlorine gas, and thus the $N_2$ is not suitable as the porous carbon material precursor. From the viewpoint of obtaining a sufficient reaction time, a burning time is preferably one hour or more, and is preferably 24 hours or less from the viewpoint of production at low costs. When a heating temperature under the inert gas atmosphere is 1650° C. or higher, since the crystal type of the produced SiC changes to an α-type and treatment energy increases, it is not preferable to set the heating temperature to an excessively high temperature. In the mixture, $SiO_2$ and carbon-containing material is preferably mixed at a mixing ratio of $SiO_2$:C=1:3 to 1:4. With this mixing ratio, since the amount of $SiO_2$ remaining in the produced porous carbon material precursor is reduced, electrical conductivity of the porous carbon can be improved. Further, a carbon component may remain, the residual carbon can be burned and removed in air or oxygen containing atmosphere.

The mixture of Si and carbon-containing material can be used as the raw material of porous carbon material. In this case, a high carbon-containing material such as carbon black or coke can be used as the carbon-containing material. In the first step, SiC (porous carbon material precursor) having a β-type crystal structure can be obtained by heating of the mixture at a temperature of 1200° C. or higher under an inert gas atmosphere. As the inert gas, a rare gas such as He, Ar, or Ne is preferably used. When $N_2$ is used, since Si and N bind to each other form a silicon nitride-based compound, thereby inhibiting reaction with a chlorine gas, and thus the $N_2$ is not suitable as the porous carbon material precursor. From the viewpoint of obtaining a sufficient reaction time, a burning time is preferably one hour or more, and is preferably 24 hours or less from the viewpoint of production at low costs. In the mixture, Si and carbon-containing material is preferably mixed at a mixing ratio of Si:C=1:1.1 to 1:1.5. With this mixing ratio, since the amount of $SiO_2$ remaining in the produced porous carbon material precursor is reduced, electrical conductivity of the porous carbon can be improved. Further, a carbon component may remain, the residual carbon can be burned and removed in air or oxygen containing atmosphere.

In addition, the raw material of chaff obtained by carbonizing and crushing of chaff is used as the raw material of porous carbon material. In the first step, SiC (porous carbon material precursor) having a β-type crystal structure can be obtained by heating of the raw material of chaff at a temperature of 1450° C. or higher under an inert gas atmosphere. As the inert gas, a rare gas such as He, Ar, or Ne is preferably used. When $N_2$ is used, since Si and N bind to each other form a silicon nitride-based compound, thereby inhibiting reaction with a chlorine gas, and thus the $N_2$ is not suitable as the porous carbon material precursor. From the viewpoint of obtaining a sufficient reaction time, a burning time is preferably one hour or more, and is preferably 24 hours or less from the viewpoint of production at low costs. When a heating temperature under the inert gas atmosphere is 1650° C. or higher, since the crystal type of the produced SiC changes to an α-type and treatment energy increases, it is not preferable to set the heating temperature to an excessively high temperature. As the raw material, it is preferable to use one having SiO2:C=1:3 to 1:4. With this component ratio, since the amount of $SiO_2$ remaining in the produced porous carbon material precursor is reduced, electrical conductivity of the porous carbon can be improved. Further, a carbon component may remain, the residual carbon can be burned and removed in air or oxygen containing atmosphere.

It is also preferable to subject the raw material of chaff to acid treatment before heat treatment in an inert gas atmosphere. By the acid treatment, it is possible to elute and remove impurities other than $SiO_2$ and carbon contained in the raw material of chaff, and to reduce the amount of impurities in the porous carbon material precursor. Examples of the acid to be used may include sulfuric acid, for example, hydrochloric acid, citric acid, and acetic acid other than hydrofluoric acid which dissolves $SiO_2$.

Table 1 indicates the amount of impurities contained in a washed chaff charcoal-crushed material obtained by titration of a chaff charcoal-crushed material (raw material of chaff) with citric acid, heat treatment to 80° C. under the condition of a predetermined pH, and then washing and drying it with pure water. As an analysis method, there is an ICP emission analysis method of oxidizing and removing carbon at 600° C. in the air, dissolving residual components in HF to remove $SiO_2$, and quantitatively evaluating the residual components. In samples in which pH is 2. the impurities are reduced to 0.03 mass %, which contributes to reduction of impurities after the porous carbon material precursor and the chlorine treatment or simplification of an unnecessary chlorine compound removal step.

TABLE 1

Impurities in chaff charcoal subjected to acid treatment (mass %)

| Sample | Na | K | Ca | Mg | Al | Fe | Zn | Mn | P | S | Total |
|---|---|---|---|---|---|---|---|---|---|---|---|
| Non-treatment | 0.04 | 1.86 | 0.4 | 0.13 | 0.04 | 0.03 | 0.01 | 0.11 | 0.16 | 0.03 | 2.81 |
| Only water washing | 0.04 | 0.44 | 0.9 | 0.26 | 0.02 | 0.04 | 0.02 | 0.17 | 0.14 | 0.05 | 2.08 |
| Citric acid treatment (pH 4) | 0.02 | 0.22 | 0.19 | 0.08 | <0.01 | 0.02 | <0.01 | 0.06 | 0.05 | 0.02 | 0.66 |
| Citric acid treatment (pH 2) | <0.01 | 0.02 | 0.01 | <0.01 | <0.01 | <0.01 | <0.01 | <0.01 | <0.01 | <0.01 | 0.03 |
| Lower limit of fixed quantity | 0.01 | 0.01 | 0.01 | 0.01 | 0.01 | 0.01 | 0.01 | 0.01 | 0.01 | 0.01 | |

The porous carbon material precursor obtained by the first step is SiC having a β-type crystal structure, in which secondary particles having a particle size of from 3 μm to 100 μm are formed, by aggregation of primary particles having a particle size of from 0.1 μm to 0.5 μm. The particle size of the primary particles and the secondary particles of the porous carbon material precursor can be confirmed by observation of a scanning electron microscope (SEM). In addition, the porous carbon material precursor preferably has an external specific surface area of from 5 $m^2$/g to 50 $m^2$/g. Here, the "external specific surface area of the porous carbon material precursor" represents a specific surface area obtained by subtracting the specific surface area of pores having a diameter 2.0 nm or smaller calculated by the t method from the nitrogen adsorption isotherm from the total specific surface area. It becomes possible to obtain a porous carbon material capable of reducing a mobility barrier of ions in an electrolyte, via the porous carbon material precursor.

A porous carbon material can be obtained by the second step of heat-treating the porous carbon material precursor. The heat treatment is preferably performed under a chlorine atmosphere, and is more preferably performed under a chlorine/nitrogen mixed atmosphere. Further, the heat treatment is preferably performed at 700° C. or higher and 1100° C. or lower. By the secondary step, the porous carbon material can be obtained which is formed from the secondary particles having the particle size from 3 μm to 100 μm, the secondary particle being formed from the primary particle having the particle size from 0.1 μm to 0.5 μm, and has the internal specific surface area of 900 $m^2$/g or greater. Here, the "internal specific surface area of the porous carbon material" represents a specific surface area of pores having a diameter 2.0 nm or smaller calculated by the t method from the nitrogen adsorption isotherm. The particle size of the primary particles and the secondary particles of the porous carbon material can be confirmed by observation of a scanning electron microscope (SEM).

According to the porous carbon material, capacitance of a capacitor can be increased by the increase of the specific surface area due to the primary particles of submicron order size, and contact resistance between particles can be reduced by the formation of the secondary particles from the primary particles.

In the porous carbon material, it is preferable that the primary particles are bonded to each other by neck growth in terms of further reducing the contact resistance between the particles.

In addition, the external specific area of the porous carbon material may be 5 m$^2$/g or greater and 50 m$^2$/g or smaller. Here, the "external specific surface area of the porous carbon material" represents a specific surface area obtained by subtracting the specific surface area of pores having a diameter 2.0 nm or smaller calculated by the t method from the nitrogen adsorption isotherm from the total specific surface area. In the capacitor using the porous carbon material according to the present embodiment, when the external specific surface area of the porous carbon material is within the above range, the contact area between the ions in the electrolyte and the porous carbon material becomes larger, whereby it is possible to reduce electric resistance which is a factor of the mobility barrier of the ions in the electrolyte.

Further, a peak of a pore size of micropores in the porous carbon material may be in the range of 7.0 Å or greater and 10 Å or smaller which is calculated by the QSDFT method from the nitrogen adsorption isotherm. Here, the QSDFT method is an abbreviation for quenching solid density-functional theory, and is a technique that is considered by introduction of a multicomponent DFT to a non-uniform pore surface and can faithfully obtain pore distribution from micropores to mesopores. Specifically, it can be calculated by the method disclosed in Langmuir 22 (2006), p11171. When the peak of the pore size of the micropores is in the range of 7.0 Å or greater and 10 Å or smaller, since the pore size of the micropores is larger than the maximum size of organic ions in the electrolyte, it is possible to reduce the electric resistance which is a factor of the mobility barrier of the ions in the electrolyte. In addition, since the pore size of the micropores is smaller than the pore size of 15 Å or greater, which does not contribute to the capacitance of the electrode, the capacitance of the electrode can be improved.

In addition, a pore volume of the micropores in the porous carbon material may be 0.3 cm$^3$/g or greater which is calculated by the t method from the nitrogen adsorption isotherm, and a pore size of the micropores may be 0.63 nm or greater which is calculated by the t method from the nitrogen adsorption isotherm. Here, the t method is a method of forming an isotherm by changing a horizontal axis of the adsorption isotherm to an average thickness of the adsorption gas and of obtaining the specific surface area, the pore volume, and the pore size of the micropores. In the case where the pore size of the micropores is 0.63 nm or greater, since the pore size of the micropores is larger than the maximum size of the organic ions in the electrolyte, the electric resistance being a factor of the mobility barrier of the ions in the electrolyte can be preferably reduced. Further, the pore volume of the micropores is 0.3 cm$^3$/g or greater, the amount of pores contributing to the capacitance can be maintained, and thus a porous carbon material having high capacitance can be obtained.

In addition, a pore volume of mesopores in the porous carbon material may be 0.1 cm$^3$/g or greater which is calculated by a BJH method from the nitrogen adsorption isotherm. Here, the BJH method is a calculation method generally used for analysis of mesopores, and is a method of obtaining pore size distribution based on the assumption of cylindrical pores and the filling by capillary condensation of $N_2$ in the pores as disclosed in J. Am. Chem. Soc., 73. (1951), p373. When the pore volume of the mesopores 0.1 cm$^3$/g or greater, it is possible to reduce the electric resistance which is a factor of the mobility barrier resulting from viscosity when ions in the electrolyte migrate.

The porous carbon material may further be subjected to activation treatment. The activation treatment, which is a third step, may be carried out by a publicly known method adopted in a usual production method of activated carbon, and may include water vapor treatment or at a high temperature or carbon dioxide treatment and a combination of the water vapor treatment and the carbon dioxide treatment. For example, the vapor treatment may preferably be performed in an atmosphere containing vapor of 0.6 g/m$^3$ or greater (equivalent to 0.1% when the amount of water vapor relative to the amount of saturated water vapor at 100° C. is taken as a water vapor concentration), and more preferably be performed in an atmosphere containing water vapor of the amount of saturated water vapor at 100° C. At this time, examples of gases that may be mixed with water vapor include He, $N_2$, Ne, Ar, Kr, Xe, $CO_2$, $O_2$, Hz, and the like. The activation treatment is preferably performed at a temperature 700° C. or higher and 1000° C. or lower. Further, the treatment time is preferably 0.01 hours or longer from the viewpoint of obtaining a sufficient reaction time, and is preferably 24 hours or shorter from the viewpoint of production at low cost. Through the activation treatment, it is possible to increase the specific surface area while maintaining the structure of the porous carbon material, and to increase the capacitance of the electric double-layer capacitor using the same.

1-2. Production Method Via Hydrocarbon-based Precursor

The porous carbon material for the electric double-layer capacitor electrode according to the present embodiment can be produced by a method of producing via a hydrocarbon-based precursor.

In this case, as the porous carbon material precursor used in the second step, a hydrocarbon-based precursor obtained by heating and sintering a hydrocarbon-based raw material can be used. The porous carbon material according to the embodiment can be obtained by subjecting the heat treatment in the second step to activation treatment in water vapor or $CO_2$ atmosphere. The activation treatment in this case can be performed by the above-described method.

2. Electrode For Electric Double-layer Capacitor Using Porous Carbon Material

Further, the electric double-layer capacitor electrode according to the present embodiment includes the porous carbon material according to the present embodiment. According to such a configuration, it is possible reduce resistance of the electric double-layer capacitor using such an electrode while keeping capacitance thereof large.

The electrode for the electric double-layer capacitor can be obtained by, for example, kneading the porous carbon material of the present embodiment, a conductivity imparting agent, a binder, and the like, further adding a solvent to adjust a paste, applying the paste to a collector plate such as an aluminum foil, and drying and removing the solvent.

In this case, the porous carbon material of the present embodiment is preferably granular. Particularly, from the viewpoint of kneading workability at the time of electrode formation, the porous carbon material having such a desired particle size may be obtained by crushing the porous carbon material. The crushing can be carried out by a known crusher such as a cone crusher, a double roll crusher, a disc crusher, a rotary crusher, a ball mill, a centrifugal roll mill, a ring roll mill, or a centrifugal ball mill. Further, particle size distribution may be controlled by further using a classifier. In order to prevent the surface of the porous carbon material from being oxidized during the crushing, the crushing is preferably performed in an oxygen-free atmosphere.

As the conductivity imparting agent, acetylene black, Ketjen black, and the like can be used. As the binder, fluorin.e-based polymer compounds such as polytetrafluoroethylene and polyfluorovinylidene, carboxymethyl cellulose, styrene-butadiene rubber, petroleum pitch, phenol resin, and the like can be used.

The electric double-layer capacitor generally includes an electrode, an electrolyte, and a separator as main components, and has a structure in which the separator is disposed between a pair of electrodes. Examples of electrolytes include an electrolyte in which an amidine salt is dissolved in an organic solvent such as propylene carbonate, ethylene carbonate, or methylethyl carbonate; an electrolyte in which an alkali metal tetratluoride salt such as quaternary ammonium or lithium or a hexalluorophosphate is dissolved; and an electrolyte in which a quaternary phosphonium salt is dissolved. As example of the separator includes cellulose, glass fiber, nonwoven fabric containing polyolefin such as polyethylene and polypropylene as a main component, cross, or a microporous film.

EXAMPLES

Hereinafter, results of an evaluation test using examples of the present invention will be indicated, and the present invention will be described in more detail. It should be noted that the present invention is not limited to these examples.

1-1. Production of Porous Carbon Material

Chaff charcoal (molar ratio; $SiO_2:C=1:3$) produced by Kansai Co., Ltd. was subjected to heat treatment at 1600° C. for three hours under a rare gas (He) atmosphere. The product was evaluated for a crystal structure by X-ray diffraction. The crystal structure of the obtained SiC was a β-type. It was confirmed that graphite was mixed in such a crystal phase.

The obtained SiC was subjected to heat treatment, using a horizontal rotary furnace, at 1100° C. for three hours under a chlorine/nitrogen mixed atmosphere, and thus a porous carbon material derived from the chaff charcoal was produced. The obtained porous carbon material was crushed in a mortar and then subjected to microstructure analysis and electric conductivity evaluation.

For comparison with this, commercially available SiC having an α-type crystal structure was subjected to heat treatment, using a horizontal rotary furnace, at 1100° C. for 3 to 4 hours under a chlorine/nitrogen mixed atmosphere, a porous carbon material derived from a commercially available reagent was produced. The obtained porous carbon material was crushed in a mortar and then subjected to microstructure analysis and electric conductivity evaluation.

Specifically, the microstructure analysis was performed by observation of the porous carbon material with a scanning electron microscope and analysis according to a nitrogen adsorption method.

Figure 2:
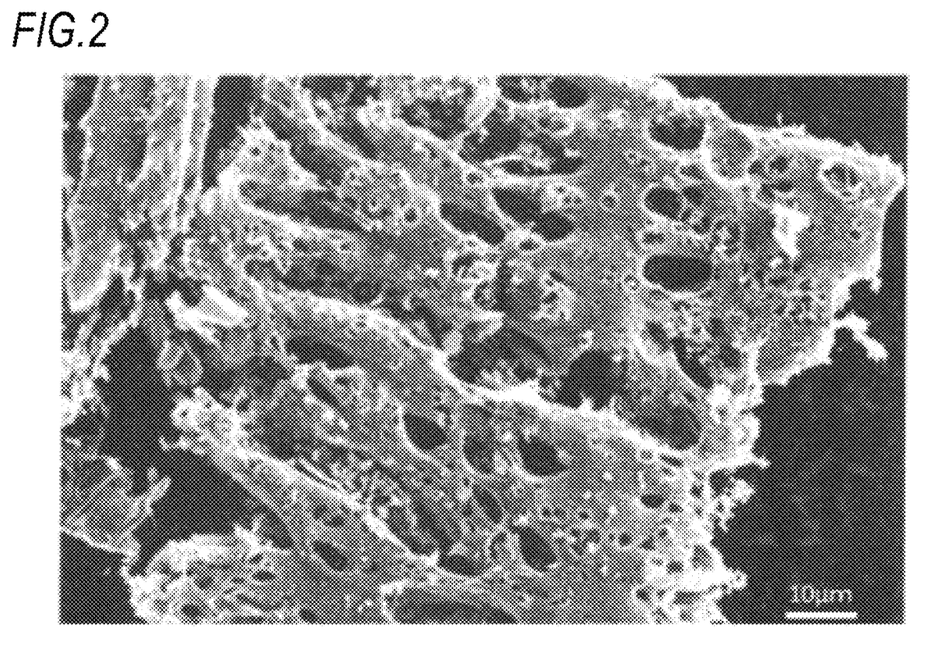
FIG. 2 is an electron micrograph illustrating a structure of a porous carbon material according to an embodiment of the present invention.
Figure 3:
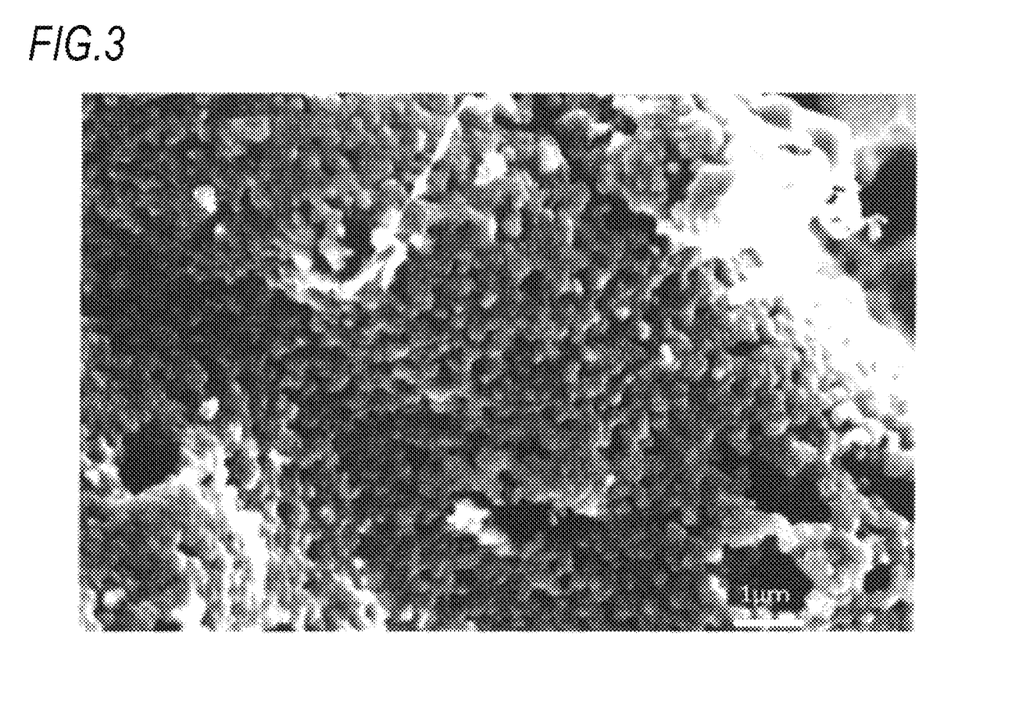
FIG. 3 is an electron micrograph illustrating a structure of a porous carbon material according to the embodiment of the present invention.

FIGS. 2 and 3 are photographs obtained by observation of the porous carbon derived from the chaff charcoal with a scanning electron microscope. FIG. 3 is an enlarged photograph of FIG. 2, and a structure can be confirmed from this drawing in which primary particles of about 0.2 μm are bonded to each other, thereby forming secondary particles of about tens of to hundreds of μm.

Table 2 summarizes the results of the microstructure analysis and the electric conductivity evaluation of the porous carbon derived from the chaff charcoal and the commercially available αSiC. It indicates a specific surface area calculated from an $N_2$ adsorption isotherm, a mesopore volume calculated by a BJH method, a micropore volume calculated by a t method, an average micropore size, and a micropore peak obtained by a QSDFT method.

TABLE 2

| | Example 1 | Example 2 |
|---|---|---|
| Porous carbon precursor | βSiC derived from chaff charcoal | Commercially available αSiC |
| BET specific surface area ($m^2/g$) | 1050 | 1150 to 1250 |
| BET internal specific surface area ($m^2/g$) | 960 | 1100 to 1200 |
| Mesopore volume calculated by BJH method (cc/g) | 0.25 | <0.05 |
| Micropore volume calculated by t method (cc/g) | 0.38 | 0.50 to 0.52 |
| Average micropore size calculated by t method (nm) | 0.73 | 0.56 |
| Electric conductivity (s/cm) | 7.6 | 4.6 |
| Primary particle size (μm) | 0.2 | |
| Secondary particle size (μm) | 45 | 30 |
| Micropore peak obtained by QSDFT (nm) | 0.76 | less than 0.60 |

A porous carbon material (Example 1) derived from the chaff charcoal has a larger mesopore volume and a smaller micropore volume than a porous carbon material (Example 2) derived from the commercially available αSiC. In addition, electric conductivity of Example 1 is larger than that of Example 2. This is considered to be derived from the bonding of the primary particles as illustrated in FIG. 3.

Figure 4:
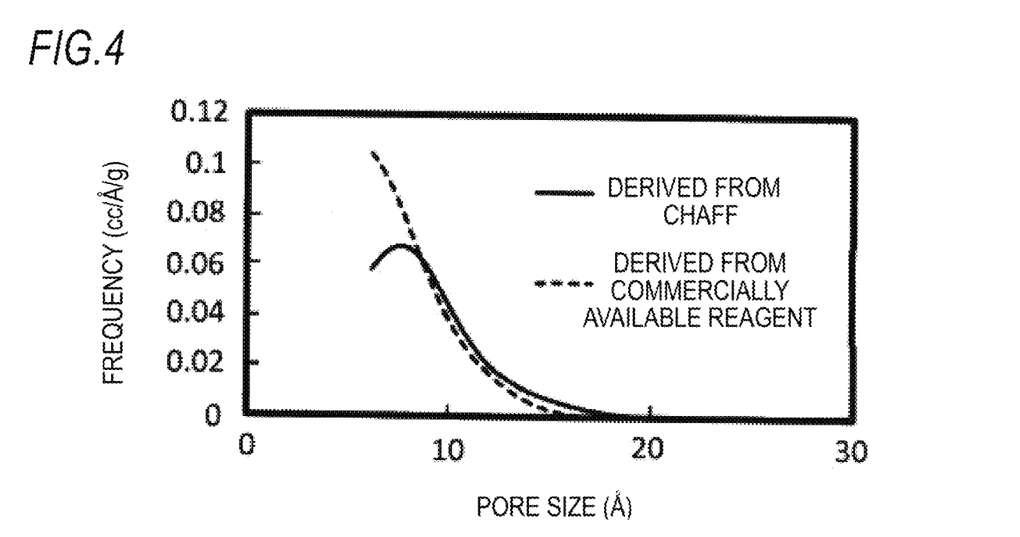
FIG. 4 is a graph illustrating results of micropore analysis performed by a QSDFT method from nitrogen adsorption isotherms of porous carbon materials according to Examples 1 and 2 and a porous carbon material for comparison.

Pore distribution analyzed by the QSDFT method (slit-type pore analysis) is illustrated in FIG. 4. From FIG. 4, it can be confirmed that the micropore peak of the porous carbon derived from the chaff charcoal is around 8 Å and is different from the pore distribution of the porous carbon derived from the commercially available reagent (derived from the α-type SiC) having the peak in the region of less than 6 Å.

1-2. Production of Porous Carbon Material (Example Using Silica/Carbon Mixture)

A mixture of fumed silica and carbon black (molar ratio; $SiO_2:C=1:3$) was subjected to heat treatment at 1550° C. for 3 hours under a rare gas (He) atmosphere, and thus SiC having a β-type crystal structure was produced.

The SiC was subjected to heat treatment, using a horizontal rotary furnace, at 900° C. to 1100° C. for 3 to 4 hours under a chlorine/nitrogen mixed atmosphere, whereby a porous carbon material was produced. After the obtained porous carbon material was crushed in a mortar, an $N_2$ adsorption isotherm was measured and microstructure analysis was performed. The analysis results are indicated in Table 3.

TABLE 3

| | Example 3 | Example 4 | Example 5 |
|---|---|---|---|
| Treatment temperature in chlorine atmosphere (° C.) | 900 | 1000 | 1100 |
| BET specific surface area ($m^2/g$) | 1280 | 1250 | 1260 |

TABLE 3-continued

| | Example 3 | Example 4 | Example 5 |
|---|---|---|---|
| BET internal specific surface area ($m^2/g$) | 1220 | 1200 | 1210 |
| Mesopore volume calculated by BJH method (cc/g) | 0.15 | 0.14 | 0.13 |
| Micropore volume calculated by t method (cc/g) | 0.51 | 0.50 | 0.50 |
| Average micropore size calculated by t method (nm) | 0.74 | 0.73 | 0.72 |
| Primary particle size (μm) | 0.25 | 0.25 | 0.25 |
| Secondary particle size (μm) | 15 | 15 | 15 |
| Micropore peak obtained by QSDFT (nm) | 0.81 | 0.80 | 0.77 |

In addition, pore distribution was analyzed by a QSDFT method (slit-type pore analysis). It was confirmed that a micropore peak of the βSiC porous carbon derived from a silica/carbon mixture was around 8 Å and was different from the pore distribution of the porous carbon derived from the commercially available α-type SiC.

1-3. Production of Porous Carbon Material (Example Using Silicon/Carbon Mixture)

As disclosed in Japanese Unexamined Patent Application Publication No. 2015-224142. βSiC produced by Nakamura Choukou Co., Ltd. was used as a raw material which was produced by blending and mixing grinding silicon chips and carbon black at a predetermined ratio, performing heat treatment on the mixture in an argon (Ar) atmosphere, and firing a residual carbon component at 500 to 600° C. in air.

The SiC was subjected to heat treatment, using a horizontal rotary furnace, at 900° C. to 1200° C. for 2 to 4 under a chlorine/nitrogen mixed atmosphere, whereby a porous carbon material was produced. After the obtained porous carbon material was crushed in a mortar, an $N_2$ adsorption isotherm was measured and microstructure analysis was performed. The analysis results are indicated in Table 4.

TABLE 4

| | Example 6 | Example 7 | Example 8 | Example 9 |
|---|---|---|---|---|
| Treatment temperature in chlorine atmosphere (° C.) | 900 | 1000 | 1100 | 1200 |
| BET specific surface area ($m^2/g$) | 1150 | 1280 | 1250 | 1150 |
| BET internal specific surface area ($m^2/g$) | 1120 | 1260 | 1230 | 1110 |
| Mesopore volume calculated by BJH method (cc/g) | 0.33 | 0.35 | 0.35 | 0.37 |
| Micropore volume calculated by t method (cc/g) | 0.45 | 0.48 | 0.46 | 0.45 |
| Average micropore size calculated by t method (nm) | 0.72 | 0.73 | 0.74 | 0.71 |
| Primary particle size (μm) | 0.4 | 0.4 | 0.4 | 0.4 |
| Secondary particle size (μm) | 3.5 | 3.5 | 3.5 | 3.5 |
| Micropore peak obtained by QSDFT (nm) | 0.81 | 0.80 | 0.81 | 0.80 |

Figure 5:
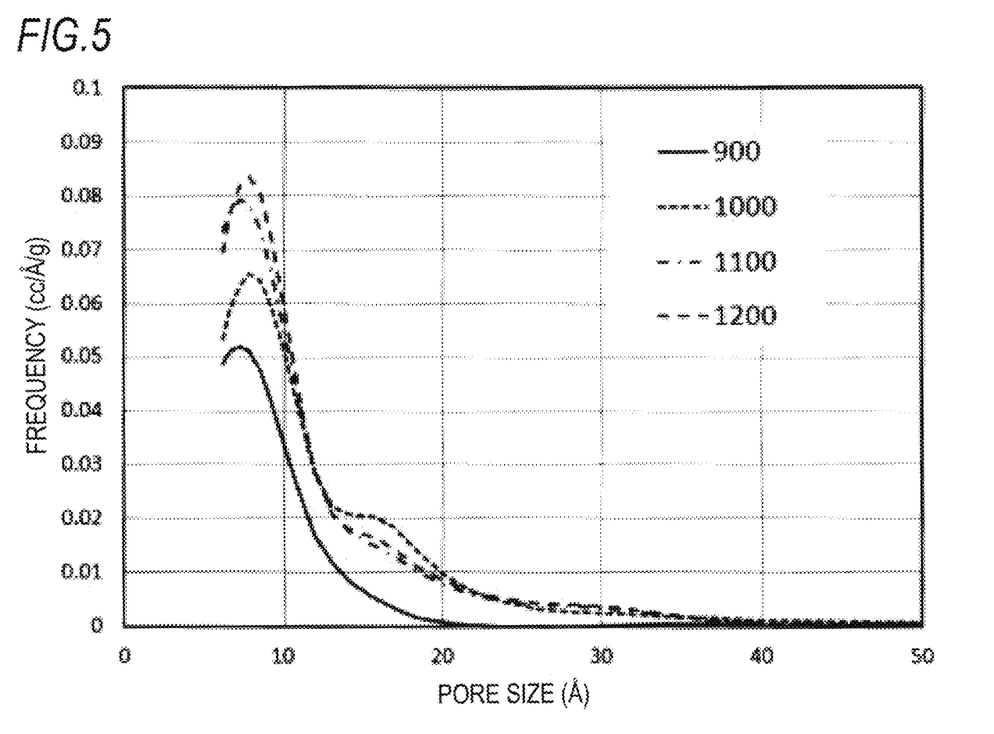
FIG. 5 is a graph illustrating results of micropore analysis performed by a QSDFT method from nitrogen adsorption isotherms of porous carbon materials according to Examples 6 to 9.

In addition, pore distribution was analyzed by a QSDFT method (slit-type pore analysis). The pore distribution is indicated in FIG. 5. It was confirmed that a micropore peak of 10 Å or smaller of the βSiC porous carbon derived from a silicon raw material was around 8 Å in the temperature range of 900 to 1200° C. and was different from the pore distribution of the porous carbon derived from the α-type SiC.

2. Evaluation of Capacitance and DC Resistance of Electric Double-Layer Capacitor Using Porous Carbon Material A porous carbon material, a PTFE binder, and Ketjen black (conductive assistant) were kneaded at a weight ratio of 86:7:7 to obtain a sheet electrode having a thickness of 70 μm. In a single-layer laminate cell using this electrode and propylene carbonate solution of 1.4M-TEMABF4. capacitance (0 to 2.5 V) at room temperature and a resting resistance were evaluated.

Evaluation results of electric double-layer capacitors using porous carbon materials (Examples 1 to 4) derived from chaff, commercially available αSiC, or βSiC formed from a silica/carbon mixture as a porous carbon material are indicated in Table 5.

TABLE 5

| Porous carbon | Example 1 | Example 2 | Example 3 | Example 4 |
|---|---|---|---|---|
| Specific surface area ($m^2/g$) | 1060 | 1330 | 1280 | 1250 |
| Capacity per unit weight (F/g) | 21.8 | 27.3 | 27.2 | 25.9 |
| Capacity per unit area (F · $g/m^2$) | 0.0205 | 0.0205 | 0.0212 | 0.0207 |
| DC resistance (Ω) | 1.68 | 15.42 | 1.65 | 1.70 |

As compared with the porous carbon material (Example 2) derived from the commercially available αSiC, it is considered that the porous carbon materials (Examples 1, 3. and 4) derived from the chaff or the βSiC formed from the silica/carbon mixture have the capacity pre unit specific surface area, which is normalized by the BET specific surface area, equivalent to or higher than 0.0205 $F/m^2$, and will be equivalent characteristics when the specific surface area is further increased. Further, the DC resistance was about 15 Ω in Example 2. but it was confirmed that the DC resistance was reduced to ⅛ or less in Examples 1, 3. and 4.

3. Production of Porous Carbon Material (Example Using Easily Graphitizable Carbon)

Carbon microparticles obtained by thermally decomposing benzene were used as a raw material of easily graphitizable carbon. Benzene was introduced into a carbonization furnace heated to 800° C. while being bubbled with nitrogen gas, thereby forming spherical carbon microparticles having a particle size of 0.1 to 0.4 μm. The carbon microparticles were dispersed and kneaded in a carboxymethyl cellulose (CMC) alcohol solution to be dried and crushed, and then the CMC was carbonized at 500° C., whereby easily graphitizable carbon particles having an average particle size of 8 μm were formed. A BET specific surface area of the easily graphitizable carbon was 12 $m^2/g$. At this point, a [002] plane of the carbon particle could not be confirmed by X-ray diffraction analysis. The carbon particles were subjected to activation treatment for 4 hours in an atmosphere of 15% water vapor (remaining $N_2$) at 800° C., thereby becoming activated carbon.

The obtained activated carbon had an average particle size of 7.8 μm, a BET specific surface area of 1500 $m^2/g$, and an external specific surface area of 40 $m^2/g$. An average pore size of the micropore obtained by the QSDFT method was 0.85 nm, a micropore volume was 0.45 cc/g, and a mesopore volume of 2 nm or greater was 0.2 cc/g.

Using the activated carbon, a conductive assistant and a binder were kneaded to prepare a sheet electrode with an electrode area of 2.8 $cm^2$, and the capacity and resistance of the electric double-layer capacitor were evaluated in the range of 0 to 2.5 V using 1.4 M TEMA·$BF_4$/PC electrolyte as an electrolyte. The capacity per unit weight was 29 F/g, and the capacity per electrode volume 15.9 F/cc. The resistance value was measured by a current rest method, and was 2.05 Ω at room-temperature discharge and 19 Ω at low temperature (−30° C.).

Although the present invention has been described in detail with reference to specific aspects, it will be apparent to those skilled in the art that various changes and modifications can be made without departing from the spirit and scope of the present invention.

The invention claimed is:

1. A porous carbon material for an electric double-layer capacitor electrode, wherein
    the porous carbon material is formed from secondary particles having a particle size of from 3 μm to 100 μm,
    the secondary particles are formed from primary particles having a particle size of from 0.1 μm to 0.5 μm,
    the porous carbon material has an internal specific surface area of 900 m$^2$/g or greater, and
    a pore volume of micropores in the porous carbon material is 0.3 cm$^3$/g or greater which is calculated by a t method from a nitrogen adsorption isotherm.

2. The porous carbon material according to claim 1, wherein
    the primary particles are bonded to each other by neck growth.

3. The porous carbon material according to claim 1, wherein
    the porous carbon material has an external specific surface area of from 5 m$^2$/g to 50 m$^2$/g.

4. The porous carbon material according to claim 1, wherein
    a peak of a pore size of micropores in the porous carbon material is in a range of from 7.0 Å to 10 Å which is calculated by a QSDFT method from a nitrogen adsorption isotherm.

5. The porous carbon material according to claim 1, wherein
    a pore size of the micropores is 0.63 nm or greater which is calculated by the t method from the nitrogen adsorption isotherm.

6. The porous carbon material according to claim 1, wherein
    a pore volume of mesopores in the porous carbon material is 0.1 cm$^3$/g or greater which is calculated by a BJH method from a nitrogen adsorption isotherm.

7. An electric double-layer capacitor electrode comprising the porous carbon material according to claim 1.

* * * * *